United States Patent
Nishikawa

(10) Patent No.: US 8,817,906 B2
(45) Date of Patent: Aug. 26, 2014

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 13/894,418

(22) Filed: May 14, 2013

(65) Prior Publication Data

US 2013/0315322 A1 Nov. 28, 2013

(30) Foreign Application Priority Data

May 25, 2012 (JP) ................................ 2012-119331

(51) Int. Cl.
*H04B 7/02* (2006.01)
*H04L 27/26* (2006.01)

(52) U.S. Cl.
CPC ................................. *H04L 27/2618* (2013.01)
USPC ........... 375/267; 375/260; 375/299; 375/316; 370/203; 370/208; 370/210

(58) Field of Classification Search
CPC .............. H04L 27/2601; H04L 27/265; H04L 27/2628; H04L 27/2647
USPC .......... 375/260, 267, 299, 316; 370/203, 208, 370/210
See application file for complete search history.

(56) References Cited

U.S. PATENT DOCUMENTS

| | | | | |
|---|---|---|---|---|
| 2008/0260055 | A1* | 10/2008 | Kim et al. | 375/260 |
| 2013/0107982 | A1* | 5/2013 | Nishikawa | 375/295 |
| 2013/0107983 | A1* | 5/2013 | Nishikawa | 375/295 |
| 2013/0188631 | A1* | 7/2013 | Nishikawa | 370/344 |
| 2013/0195098 | A1* | 8/2013 | Nishikawa | 370/344 |
| 2013/0215994 | A1* | 8/2013 | Nishikawa | 375/295 |
| 2013/0223560 | A1* | 8/2013 | Nishikawa | 375/295 |

FOREIGN PATENT DOCUMENTS

JP 2006-165781 6/2006

* cited by examiner

*Primary Examiner* — Daniel Washburn
*Assistant Examiner* — Eboni Hughes
(74) *Attorney, Agent, or Firm* — Baker & McKenzie LLP

(57) ABSTRACT

A modulator 11 modulates an input signal in a predetermined modulation manner to generate a primary modulation signal. The serial-parallel converter 12 applies a serial-parallel conversion to a predetermined number of complex numbers and the primary modulation signal, and assigns the converted complex numbers and primary modulation signal to subcarriers to generate a subcarrier modulation signal. An IFFT calculator 13 applies an IFFT to the subcarrier modulation signal. A decomposer 14 decomposes a calculation result into real-part data and imaginary-part data. A real-part calculator 151 subtracts the average value of the maximum value and minimum value of elements of the real-part data from each element of the real-part data. An imaginary-part calculator 152 carries out a similar calculation on the imaginary-part data. A combiner 16 combines the calculated real-part data and imaginary-part data to generate a baseband signal. A transmitter 17 transmits a transmission signal generated from the baseband signal.

10 Claims, 8 Drawing Sheets

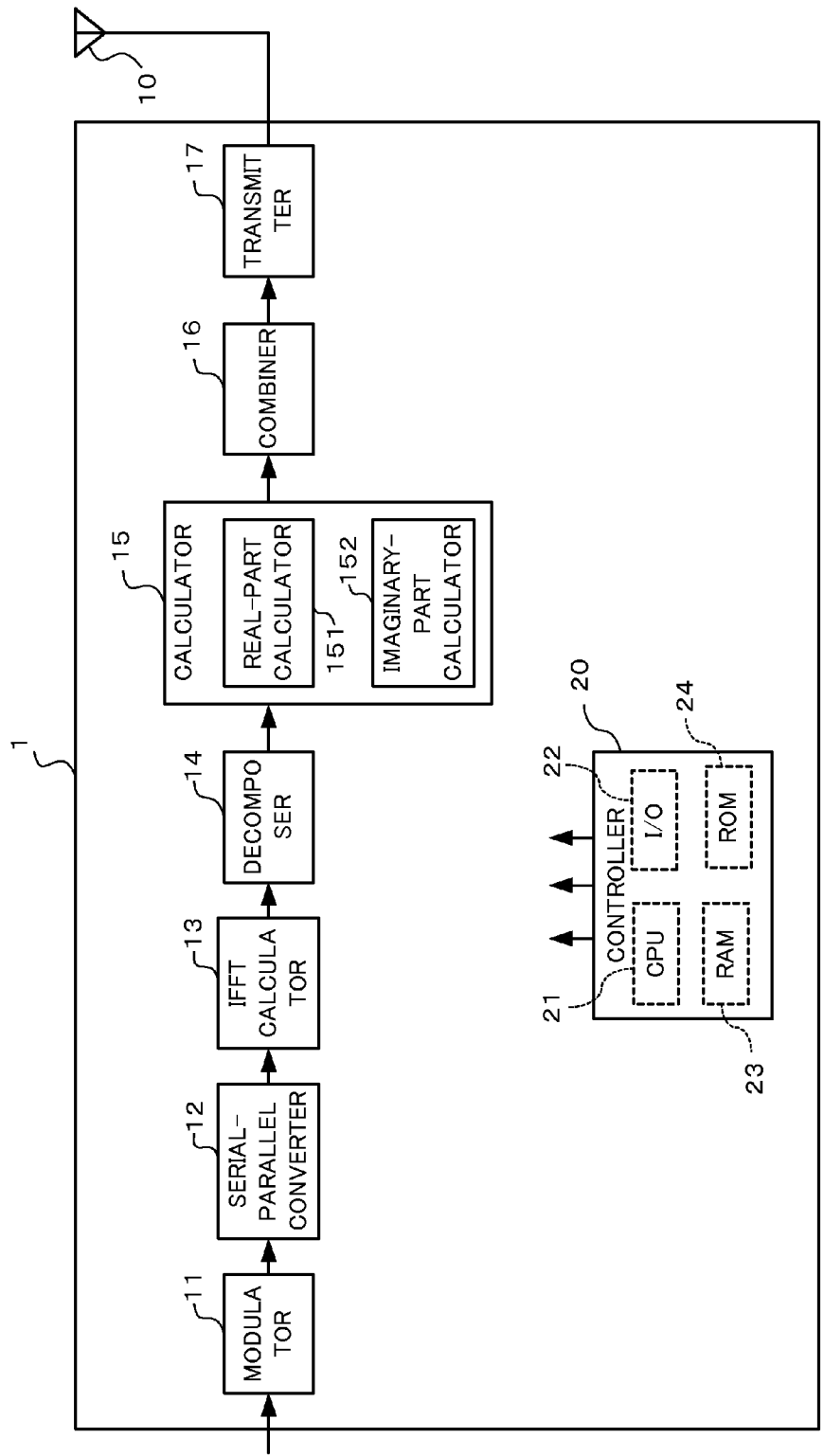

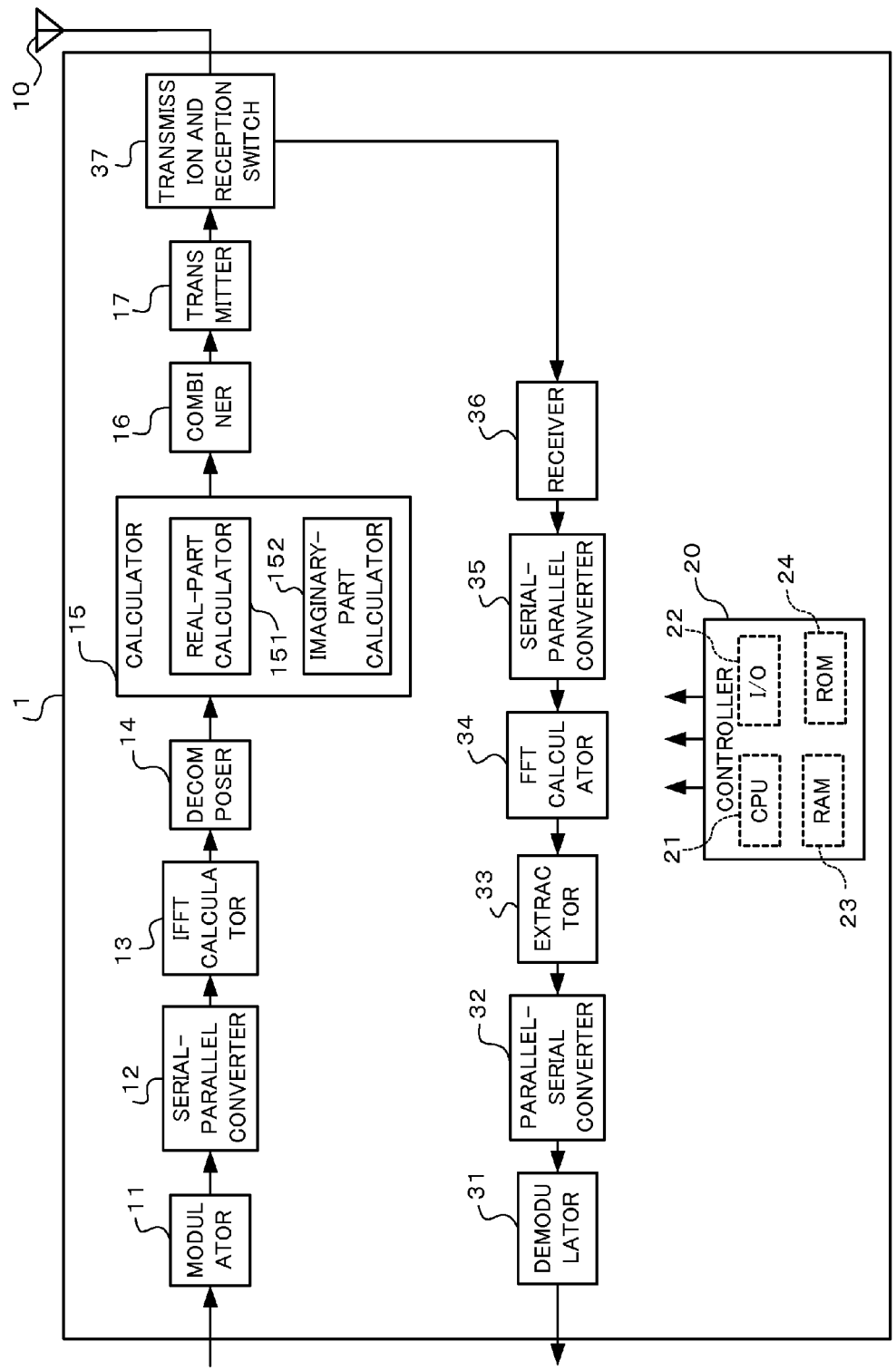

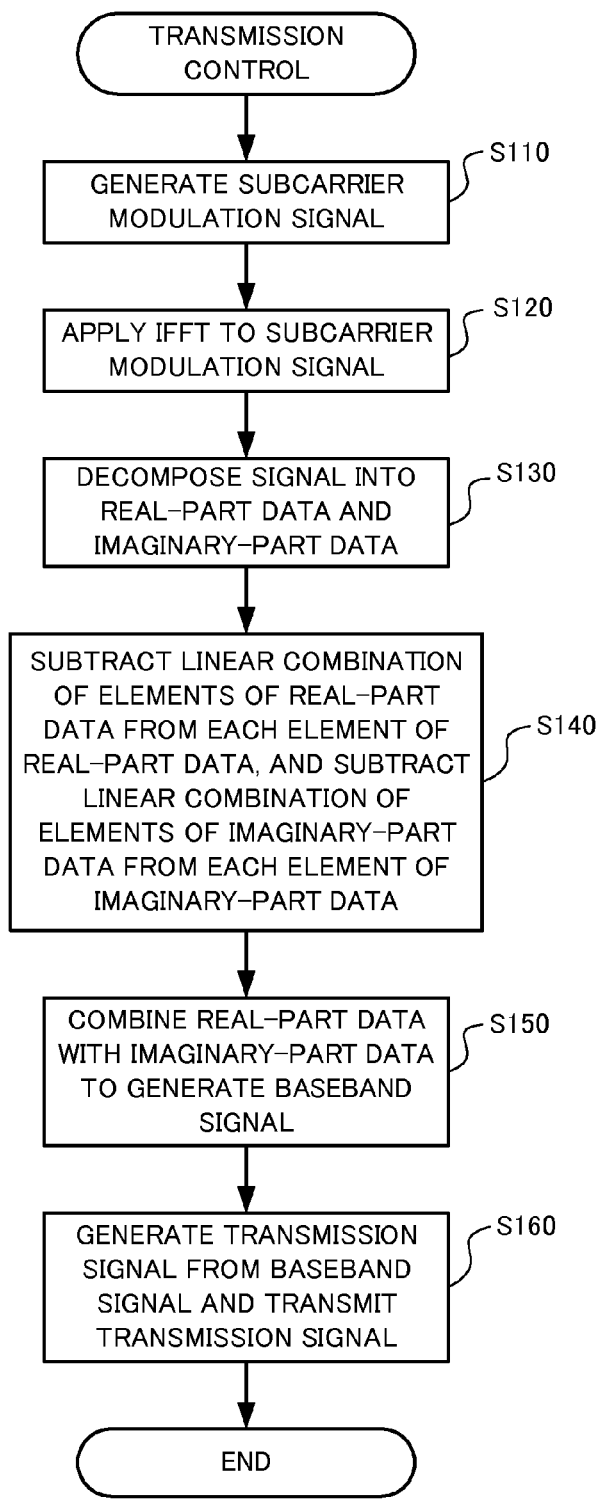

COMMUNICATION DEVICE AND COMMUNICATION METHOD

CROSS-REFERENCE TO RELATED APPLICATION

This application claims the benefit of Japanese Patent Application No. 2012-119331, filed on May 25, 2012, the entire disclosure of which is incorporated by reference herein.

FIELD

This application relates to a communication device and a communication method.

BACKGROUND

In OFDM (Orthogonal Frequency-Division Multiplexing) communications, an input signal is applied a subcarrier modulation and an IFFT (Inverse Fast Fourier Transformation) to generate a baseband signal. Thus, the OFDM communication is characterized in that an increase in the number of subcarriers and in FFT (Fast Fourier Transformation) size results in a baseband signal with a large peak and increases PAPR (Peak-to-Average Power Ratio). The increased PAPR leads to the need for an amplifier having linearity over a wide range in order to transmit signals without distortion. Therefore, a technique for reducing PAPR has been developed.

In order to reduce PAPR, a technique described in Unexamined Japanese Patent Application Kokai Publication No. 2006-165781 controls the phase of a subcarrier modulation signal based on an optimal phase calculated in a sequential decision procedure before performing an IFFT.

SUMMARY

A first aspect of the present invention provides a communication device which communicates with another device by wireless communication in an orthogonal frequency division multiplexing manner, the communication device including:

a modulator modulating an input signal in a predetermined modulation manner to generate a primary modulation signal, assigning a predetermined number of any complex numbers and elements of the primary modulation signal to subcarriers frequency components of which are orthogonal to each other to generate a subcarrier modulation signal;

an IFFT calculator applying an inverse fast fourier transform to the subcarrier modulation signal to generate a converted signal;

a decomposer decomposing the converted data into real-part data that is a real part of the converted data and imaginary-part data that is an imaginary part of the converted data;

a calculator subtracting, from each element of the real-part data, a linear combination of the elements of the real-part data obtained using coefficients each of which is a real number of 0 or more and which total 1, and subtracting, from each element of the imaginary-part data, a linear combination of the elements of the imaginary-part data obtained using coefficients each of which is a real number of 0 or more and which total 1;

a combiner generating a baseband signal based on data that is a combination of the real-part data and the imaginary-part data calculated by the calculator; and a transmitter generating a transmission signal from the baseband signal and transmitting the transmission signal.

Preferably, the calculator subtracts, from each element of the real-part data, an average value of a maximum value and a minimum value of the elements of the real-part data, an average value of the elements of the real-part data, or a median of the elements of the real-part data, and subtracts, from each element of the imaginary-part data, an average value of a maximum value and a minimum value of the elements of the imaginary-part data, an average value of the elements of the imaginary-part data, or a median of the elements of the imaginary-part data.

Preferably, the modulator assigns one of the complex numbers and elements of the primary modulation signal to the subcarriers to generate the subcarrier modulation signal.

Preferably, the modulator uses data with a value of 0 or 1 a number of which is determined based on the predetermined modulation manner to modulate the data in the predetermined modulation manner to generate the predetermined number of the complex numbers, and assigns the complex numbers and elements of the primary modulation signal to the subcarriers to generate the subcarrier modulation signal.

A second aspect of the present invention provides a communication device which communicates with another device by wireless communication in an orthogonal frequency division multiplexing manner, the communication device including:

a receiver receiving a transmission signal to generate a baseband signal;

a serial-parallel converter applying a serial-parallel conversion to the baseband signal to generate a parallel signal;

an FFT calculator applying a fast fourier transform to the parallel signal;

an extractor extracting a predetermined element from a calculation result from the FFT calculator to generate a subcarrier modulation signal; and a demodulator demodulating the subcarrier modulation signal in a predetermined demodulation manner.

A third aspect of the present invention provides a communication method carried out by a communication device which communicates with another device by wireless communication in an orthogonal frequency division multiplexing manner, the method including:

a modulation step for modulating an input signal in a predetermined modulation manner to generate a primary modulation signal, assigning a predetermined number of any complex numbers and elements of the primary modulation signal to subcarriers frequency components of which are orthogonal to each other to generate a subcarrier modulation signal;

an IFFT calculation step for applying an inverse fast fourier transform to the subcarrier modulation signal to generate a converted signal;

a decomposition step for decomposing the converted data into real-part data that is a real part of the converted data and imaginary-part data that is an imaginary part of the converted data;

a calculation step for subtracting, from each element of the real-part data, a linear combination of the elements of the real-part data obtained using coefficients each of which is a real number of 0 or more and which total 1, and subtracting, from each element of the imaginary-part data, a linear combination of the elements of the imaginary-part data obtained using coefficients each of which is a real number of 0 or more and which total 1;

a combination step for generating a baseband signal based on data that is a combination of the real-part data and the imaginary-part data calculated by the calculator; and a transmission step for generating a transmission signal from the baseband signal and transmitting the transmission signal.

Preferably, the calculation step subtracts, from each element of the real-part data, an average value of a maximum value and a minimum value of the elements of the real-part data, an average value of the elements of the real-part data, or a median of the elements of the real-part data, and subtracts, from each element of the imaginary-part data, an average value of a maximum value and a minimum value of the elements of the imaginary-part data, an average value of the elements of the imaginary-part data, or a median of the elements of the imaginary-part data.

Preferably, the modulation step assigns one of the complex numbers and elements of the primary modulation signal to each of the subcarriers to generate the subcarrier modulation signal.

Preferably, the modulation step uses data with a value of 0 or 1 a number of which is determined based on the predetermined modulation manner to modulate the data in the predetermined modulation manner to generate the predetermined number of the complex numbers, and assigns the complex numbers and elements of the primary modulation signal to the subcarriers to generate the subcarrier modulation signal.

A fourth aspect of the present invention provides a communication method carried out by a communication device which communicates with another device by wireless communication in an orthogonal frequency division multiplexing manner, the method including:

a reception step for receiving a transmission signal to generate a baseband signal;

a serial-parallel conversion step for applying a serial-parallel conversion to the baseband signal to generate a parallel signal;

an FFT calculation step for applying a fast fourier transform to the parallel signal;

an extraction step for extracting a predetermined element from a calculation result from the FFT calculation step to generate a subcarrier modulation signal; and a demodulation step for demodulating the subcarrier modulation signal in a predetermined demodulation manner.

According to the aspects of the present invention, it is possible to reduce PAPR in OFDM communications and facilitate a process for reducing PAPR.

BRIEF DESCRIPTION OF THE DRAWINGS

A more complete understanding of this application can be obtained when the following detailed description is considered in conjunction with the following drawings, in which:

FIG. 1 is a block diagram illustrating an example of configuration of a communication device according to an embodiment of the present invention;

FIG. 2 is a block diagram illustrating another example of configuration of the communication device according to the embodiment;

FIG. 5 is a flowchart illustrating an example of a transmission control operation performed by the communication device according to the embodiment;

DETAILED DESCRIPTION

Figure 3A:
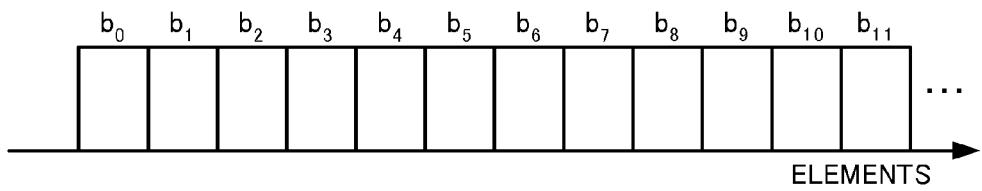
FIG. 3A-C are diagrams illustrating examples of generations of subcarrier modulation signals in the communication device according to the embodiment.

Reducing PAPR is a challenge for OFDM communications. The technique described in Unexamined Japanese Patent Application Kokai Publication No. 2006-165781 needs to repeat a calculation process to control the phase of each subcarrier in order to calculate the optimal phase for a reduction in PAPR.

In view of these circumstances, it is an object of the present invention to reduce PAPR in OFDM communications and to facilitate a process for reducing PAPR.

An embodiment of the present invention will be described below in detail with reference to the drawings. Identical or similar components in the drawings are denoted by identical reference numerals. In the following description, IFFT refers to both IFFT and IDFT (Inverse Discrete Fourier Transformation). Therefore, the embodiment of the present invention is configured to perform IDFT instead of IFFT, in some cases. Similarly, FFT refers to both FFT and DFT (Discrete Fourier Transformation). Moreover, if IDFT and DFT are performed, an FFT size referred to in the following description means a DFT size.

FIG. 1 is a block diagram illustrating an example of configuration of a communication device according to an embodiment of the present invention. A communication device 1 communicates with other devices by wireless communication in an OFDM manner. The communication device 1 includes an antenna 10, a modulator 11, a serial-parallel converter 12, an IFFT calculator 13, a decomposer 14, a calculator 15, a combiner 16, a transmitter 17, and a controller 20. The calculator 15 includes a real-part calculator 151 and an imaginary-part calculator 152.

A controller 20 includes a CPU (Central Processing Unit) 21, a RAM (Random Access Memory) 23, and a ROM (Read-Only Memory) 24. Signal wires from the controller 20 to each unit are omitted from the drawings in order to avoid complication and to facilitate understanding. However, the controller 20 is connected to each unit of the communication device 1 through an I/O (Input/Output) 22 to start and end processes for the units and control the contents of the processes.

The RAM 23 is configured to store, for example, data for generating a transmission frame. The ROM 24 is configured to store a control program allowing the controller 20 to control operation of the communication device 1. The controller 20 controls the communication device 1 based on the control program.

FIG. 2 is a block diagram illustrating another example of configuration of the communication device according to the embodiment. To be provided with a reception function, the communication device 1 which is illustrated in FIG. 2 further includes a demodulator 31, a parallel-serial converter 32, an extractor 33, an FFT calculator 34, a serial-parallel converter 35, a receiver 36, and a transmission and reception switch 37. With reference to the communication device 1 illustrated in FIG. 2 and including a transmission function and the reception function, a communication procedure carried out by the communication device 1 will be described below.

The modulator 11 modulates an input signal in a predetermined modulation manner to generate a primary modulation signal. For example, QPSK (Quadrature Phase-Shift Keying) is used as the modulation manner. The modulator 11 prepares a predetermined number of any complex numbers in advance and transmits the complex numbers and the primary modulation signal to the serial-parallel converter 12. The modulator 11 transmits, in one example, one complex number and the primary modulation signal to the serial-parallel converter 12.

Furthermore, the modulator 11 prepares data with a value of 0 or 1 the number of which is determined based on the predetermined modulation manner, in some cases. The modulator 11 modulates the data in the predetermined modulation manner and uses the modulated data as the predetermined number of complex numbers, in some cases. The number of data determined based on the predetermined modulation manner means a multiple of the number of non-modulated data corresponding to one modulated data. For QPSK, the number means a multiple of 2. If QPSK is used as the predetermined modulation manner, for example, two data are prepared and are applied QPSK modulation. The data generated is transmitted to the serial-parallel converter 12 together with the primary modulation signal.

The serial-parallel converter 12 applies a serial-parallel conversion to the predetermined number of complex numbers and the primary modulation signal. The serial-parallel converter 12 assigns the resultant complex numbers and elements of the resultant primary modulation signal to subcarriers of which frequency components are orthogonal to each other to generate a subcarrier modulation signal. The serial-parallel converter 12 transmits the subcarrier modulation signal to the IFFT calculator 13. The serial-parallel converter 12 assigns the predetermined number of complex numbers and the elements of the primary modulation signal to the subcarriers so that a predetermined number of elements of the subcarrier modulation signal from the beginning thereof are complex numbers and so that the subsequent elements of the subcarrier modulation signal are elements of the primary modulation signal.

It is assumed that the FFT size is denoted by N, an input signal is expressed by equation (1) illustrated below, and the two data prepared by the modulator 11 are expressed by equation (2) illustrated below.

[equation 1]

$$b = [b_0 b_1 \ldots n_{2N-4} b_{2N-3}] \quad (1)$$

[equation 2]

$$c = [c_0 c_1] \quad (2)$$

The result of a modulation of the data expressed by equation (2) in the predetermined modulation manner is denoted by $d_0$. The primary modulation signal components generated by modulating the input signal in the predetermined modulation manner are denoted by $d_1, \ldots d_m$. Then, a subcarrier modulation signal d is expressed by equation (3) illustrated below. An index T indicates that a matrix is transposed.

[equation 3]

$$d = [d_0 d_1 \ldots d_{N-1}]^T \quad (3)$$

Figure 3B:
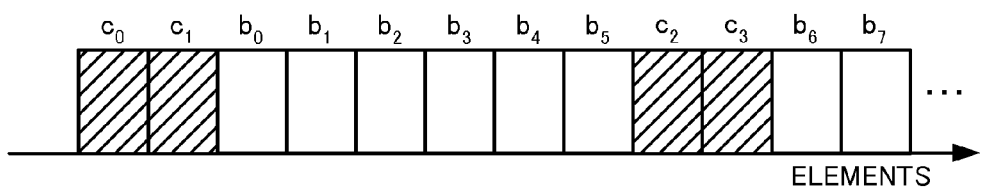
Figure 3C:
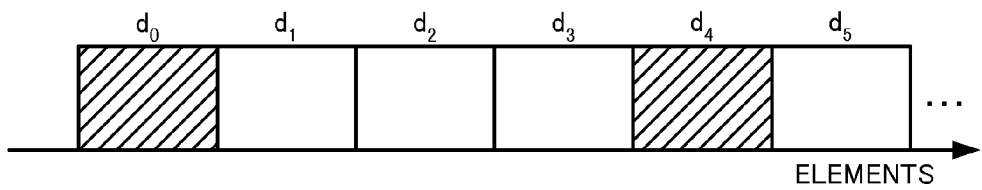

FIG. 3 is a diagram illustrating an example of generation of a subcarrier modulation signal in the communication device according to the embodiment. The modulation manner used by the modulator 11 is assumed to be QPSK, and the FFT size is assumed to be 4. FIG. 3A illustrates an input signal. FIG. 3B illustrates data the number of which is determined based on the predetermined modulation manner and the input signal illustrated in FIG. 3A; the data and the input signal are arranged in order. The data the number of which is determined based on the predetermined modulation manner are shaded in the drawing. Two data and six input signals are arranged in order, and for the subsequent input signals, the data and the input signals are similarly arranged in order. A combination of data c0 and c1 and a combination of data c2 and c3 each include the same data or different data, in some cases. FIG. 3C illustrates a subcarrier modulation signal. The subcarrier modulation signal which is illustrated in FIG. 3C is generated by assigning the results of a QPSK modulation of the elements in FIG. 3B to the respective subcarriers.

The IFFT calculator 13 applies an IFFT to the subcarrier modulation signal and transmits a calculation result to the decomposer 14. The calculation result u is expressed by equation (4).

[equation 4]

$$u = F^{-1} \cdot d \quad (4)$$

The decomposer 14 decomposes the calculation result from the IFFT calculator 13 into real-part data that is a real part of the calculation result and imaginary-part data that is an imaginary part of the calculation result. The decomposer 14 transmits the real-part data and the imaginary-part data to the calculator 15. The calculator 15 transmits the real-part data to the real-part calculator 151 and transmits the imaginary-part data to the imaginary-part calculator 152. The real-part data $u^{(r)}$ and the imaginary-part data $u^{(i)}$ are expressed by equation (5).

[equation 5]

$$u^{(r)} = \mathrm{Re}(u)$$

$$u^{(i)} = \mathrm{Im}(u) \quad (5)$$

The real-part calculator 151 subtracts, from each element of the real-part data, a linear combination of the elements of the real-part data obtained using coefficients each of which is a real number of 0 or more and which total 1. The real-part calculator 151, for example, subtracts the average value of the maximum value and the minimum value of the elements of the real-part data from each element of the real-part data. The average value of the maximum value and the minimum value of the elements of the real-part data is a linear combination of the elements of the real-part data calculated with coefficients for elements of the real-part data with the maximum value and the minimum value set to ½ and with coefficients for the other elements set to 0. When a column vector t is used which is expressed by equation (6) illustrated below and in which each element has a value of 1 and a size of which is N, the real-part data $v^{(r)}$ calculated by the real-part calculator 151 as described above is expressed by equation (7) illustrated below. In equation (7), the maximum value and the minimum value of the real-part data $u^{(r)}$ are denoted by $u^{(r)}_{max}$ and $u^{(r)}_{min}$.

[equation 6]

$$t = [1 \ 1 \ \ldots \ 1]^T \quad (6)$$

[equation 7]

$$v^{(r)} = u^{(r)} - \frac{1}{2} \cdot (u^{(r)}_{max} + u^{(r)}_{min}) \cdot t \quad (7)$$

The imaginary-part calculator 152 subtracts, from each element of the real-part data, a linear combination of the elements of the imaginary-part data obtained using coefficients each of which is a real number of 0 or more and which total 1. For example, as is the case with the calculation process carried out by the real-part calculator 151, the imaginary-part calculator 152 subtracts the average value of the maximum value and the minimum value of the elements of the imaginary-part data from each element of the imaginary-part data. When the column vector t expressed by equation (6) illustrated above is used, the imaginary-part data $v^{(i)}$ calculated by the imaginary-part calculator 152 as described above is as expressed by equation (8) illustrated below. In equation (8), the maximum value and the minimum value of the imaginary-part data $u^{(i)}$ are denoted by $u^{(i)}_{max}$ and $u^{(i)}_{min}$.

[equation 8]

$$v^{(i)} = u^{(i)} - \frac{1}{2} \cdot (u^{(i)}_{max} + u^{(i)}_{min}) \cdot t \quad (8)$$

Figure 4A:
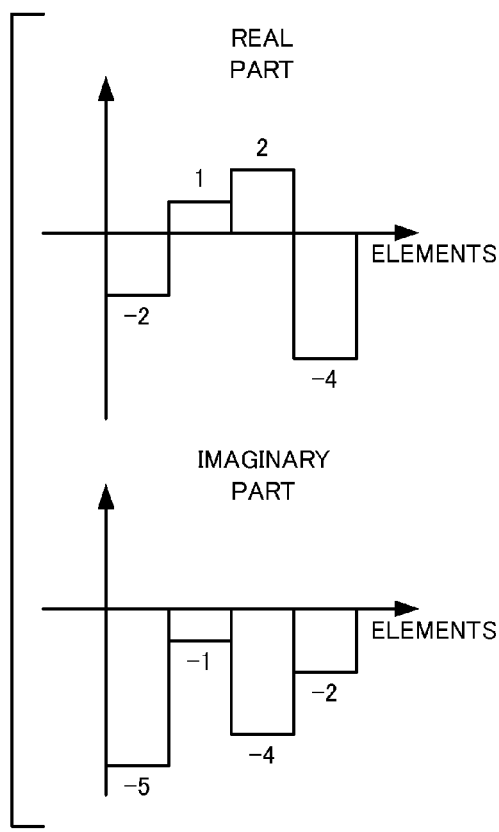
FIG. 4A-B are diagrams schematically illustrating a calculation process carried out by a calculator according to the embodiment.
Figure 4B:
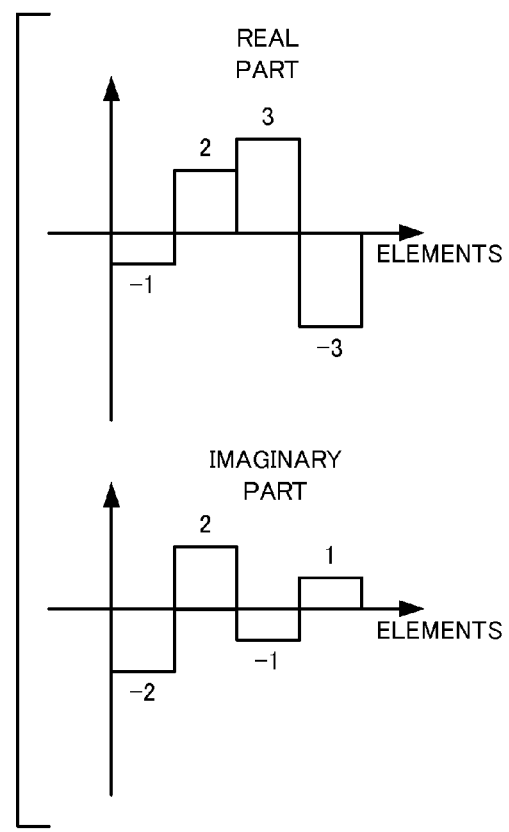

FIG. 4 is a diagram schematically illustrating a calculation process carried out by the calculator according to the embodiment. FIG. 4A illustrates the real-part data $u^{(r)}$ in an upper part thereof and the imaginary-part data $u^{(i)}$ in a lower part thereof. FIG. 4B illustrates the calculated real-part data $v^{(r)}$ in an upper part thereof and the calculated imaginary-part data $v^{(i)}$ in a lower part thereof. As illustrated in FIGS. 4A and 4B, the real-part calculator 151 subtracts the average value of the maximum value and the minimum value of the elements of the real-part data from each element of the real-part data, and the imaginary-part calculator 152 subtracts the average value of the maximum value and the minimum value of the elements of the imaginary-part data from each element of the imaginary-part data.

As described above, if the real-part calculator 151 and the imaginary-part calculator 152 carry out similar calculation processes, it is possible to implement the real-part calculator 151 and the imaginary-part calculator 152 using a single calculator. The calculator 15 transmits the real-part data calculated by the real-part calculator 151 and the imaginary-part data calculated by the imaginary-part calculator 152 to the combiner 16.

The combiner 16 combines the transmitted real-part data with the transmitted imaginary-part data and generates a baseband signal based on the combined data. The combiner 16 transmits the baseband signal to the transmitter 17. The combined data is represented by $v^{(r)}+jv^{(i)}$, where an imaginary-part data unit is denoted by j. The transmitter 17 generates a transmission signal from the baseband signal and transmits the transmission signal to another device through the transmission and reception switch 37 and the antenna 10.

FIG. 5 is a flowchart illustrating an example of a transmission control operation performed by the communication device according to the embodiment. The modulator 11 modulates an input signal in a predetermined modulation manner to generate a primary modulation signal. The modulator 11 transmits a predetermined number of any complex numbers and the primary modulation signal to the serial-parallel converter 12. The serial-parallel converter 12 then applies a serial-parallel conversion to the complex numbers and the primary modulation signal. The serial-parallel converter 12 assigns the resultant complex numbers and resultant primary modulation signal to subcarriers frequency components of which are orthogonal to each other to generate a subcarrier modulation signal (step S110). The IFFT calculator 13 applies an IFFT to the subcarrier modulation signal (step S120).

The decomposer 14 decomposes a calculation result from the IFFT calculator 13 into real-part data that is a real part of the calculation result and imaginary-part data that is an imaginary part of the calculation result (step S130). The real-part calculator 151 subtracts, from each element of the real-part data, a linear combination of the elements of the real-part data obtained using coefficients each of which is a real number of 0 or more and which total 1. The imaginary-part calculator 152 subtracts, from each element of the imaginary-part data, a linear combination of the elements of the imaginary-part data obtained using coefficients each of which is a real number of 0 or more and which total 1 (step S140).

The combiner 16 combines the calculated real-part data with the calculated imaginary-part data and generates a baseband signal based on the combined data (step S150). The transmitter 17 generates a transmission signal from the baseband signal and transmits the transmission signal to another device through the transmission and reception switch 37 and the antenna 10 (step S160). When the transmission process in step S160 is completed, the processing is terminated.

Processing on the reception side will be described below. The receiver 36 receives the transmission signal through the antenna 10 and the transmission and reception switch 37, and generates a baseband signal and transmits the baseband signal to the serial-parallel converter 35. The serial-parallel converter 35 applies a serial-parallel conversion to the baseband signal to generate a parallel signal. The serial-parallel converter 35 transmits the parallel signal to the FFT calculator 34. The FFT calculator 34 applies an FFT to the parallel signal and transmits a calculation result to the extractor 33. The extractor 33 extracts predetermined elements from the calculation result to generate a subcarrier modulation signal, and transmits the subcarrier modulation signal to the parallel-serial converter 32. The predetermined elements mean the elements at positions at which elements of the primary modulation signal are positioned in the subcarrier modulation signal generated by the transmission side. The reception side is assumed to hold information on the predetermined elements in advance.

The parallel signal matches data that is a combination of the real-part data to which the calculation expressed by equation (7) has been applied and the imaginary-part data to which the calculation expressed by equation (8) has been applied. The calculation result w from the FFT calculator 34 is expressed by equation (9) illustrated below. Since the column vector expressed by equation (6) illustrated above and in which each of the elements has a value of 1 is denoted by t, F·t is a column vector in which the elements other than element in the first row have a value of 0 in accordance with the characteristics of an FFT.

[equation 9]

$$\begin{aligned} w &= F \cdot v \\ &= F \cdot (v^{(r)} + j \cdot v^{(i)}) \\ &= F \cdot \left( u - \frac{1}{2} \cdot (u^{(r)}_{max} + u^{(r)}_{min} + v^{(r)}_{max} + v^{(r)}_{min}) \cdot t \right) \\ &= d - \frac{1}{2} \cdot (u^{(r)}_{max} + u^{(r)}_{min} + v^{(r)}_{max} + v^{(r)}_{min}) \cdot F \cdot t \end{aligned} \quad (9)$$

Thus, the calculation result w from the FFT calculator 34 is data in which only the element in the first row in the subcarrier modulation signal d is calculated. When the calculation result for the element is denoted by $d'_0$, the calculation result w from the FFT calculator 34 is expressed by equation (10). Therefore, by extracting the predetermined elements from the calculation result w from the FFT calculator 34, the extractor 33 is able to generate a subcarrier modulation signal.

[equation 10]

$$w=[d'_0 d_1 \ldots d_{N-1}]^T \qquad (10)$$

If the serial-parallel converter 12 on the transmission side applies a serial-parallel conversion to one complex number and the primary modulation signal and assigns the resultant complex number and resultant primary modulation signal to subcarriers frequency components of which are orthogonal to each other to generate a subcarrier modulation signal, the extractor 33 extracts the elements in the second and subsequent rows from the calculation result w by the FFT calculator 34 to generate a subcarrier modulation signal.

The parallel-serial converter 32 applies a parallel-serial conversion to the subcarrier modulation signal to generate a serial signal, and transmits the serial signal to the demodulator 31. The demodulator 31 demodulates the serial signal in a predetermined demodulation manner. For example, the demodulator 31 applies a QPSK demodulation to the serial signal. Thus, as expressed by equation (11), data r resulting from the demodulation by the demodulator 31 matches the input signal modulated by the modulator 11. Consequently, it is possible to restore the input signal on the reception side.

[equation 11]

$$r=[b_0 b_1 \ldots b_{2N-4} b_{2N-3}]^T \qquad (11)$$

Figure 6:
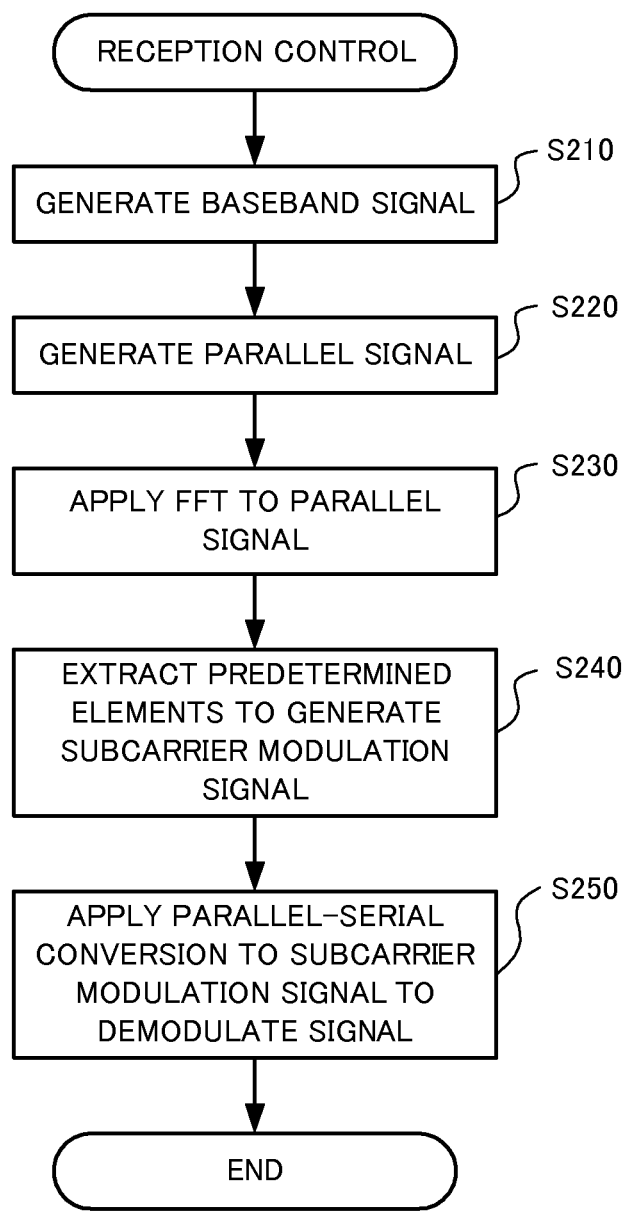
FIG. 6 is a flowchart illustrating an example of a reception control operation performed by the communication device according to the embodiment.

FIG. 6 is a flowchart illustrating an example of a reception control operation performed by the communication device according to the embodiment. The receiver 36 receives a transmission signal through the antenna 10 and the transmission and reception switch 37 and generates a baseband signal (step S210). The serial-parallel converter 35 applies a serial-parallel conversion to the baseband signal to generate a parallel signal (step S220). The FFT calculator 34 applies an FFT to the parallel signal (step S230).

The extractor 33 extracts predetermined elements from a calculation result from the FFT calculator 34 to generate a subcarrier modulation signal (step S240). The parallel-serial converter 32 applies a parallel-serial conversion to the subcarrier modulation signal to generate a serial signal, and the demodulator 31 demodulates the serial signal in a predetermined demodulation manner (step S250). When the demodulation process in step 250 is completed, the processing is terminated.

As described above, the communication device 1 according to the embodiment of the present invention, it is possible to reduce PAPR in the OFDM communication manner by generating a subcarrier modulation signal from a predetermined number of any complex numbers and a primary modulation signal and carrying out a predetermined calculation on the subcarrier modulation signal to generate a baseband signal. The communication device 1 eliminates the need for, for example, a process of controlling the phase of each subcarrier, thus enabling the process for reducing PAPR.

Specific Example

Now, effects of the embodiment of the present invention will be described based on a simulation. The simulation was such that, for a conventional technique and the embodiment of the present invention, a random signal was used as an input signal to generate a baseband signal, with PAPR repeatedly calculated. QPSK was used as a modulation manner, and the CCDF (Complementary Cumulative Distribution Function) of PAPR, in other words, the characteristics of occurrence probability of PAPR, was compared between the conventional technique and the embodiment of the present invention. The conventional technique is a method of modulating an input signal in a predetermined modulation manner without carrying out such a calculation described above on the input signal, assigning the modulated signal to subcarriers to generate a subcarrier modulation signal, and generating a baseband signal from the subcarrier modulation signal.

Figure 7A:
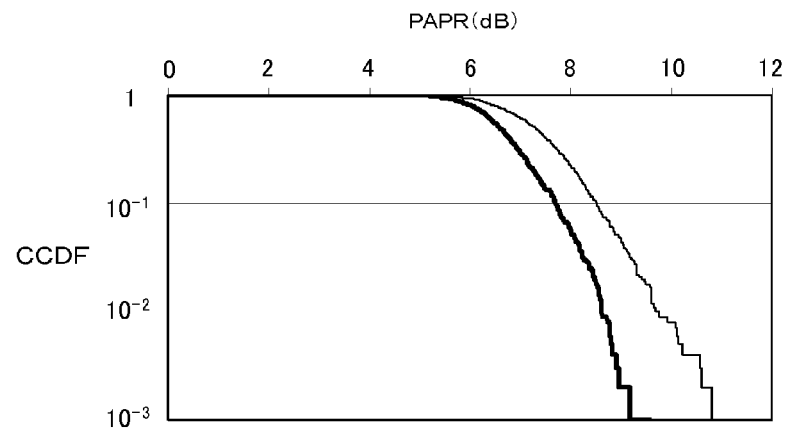
FIG. 7A-C are diagrams illustrating CCDF characteristics of PAPR of simulated baseband signals.
Figure 7B:
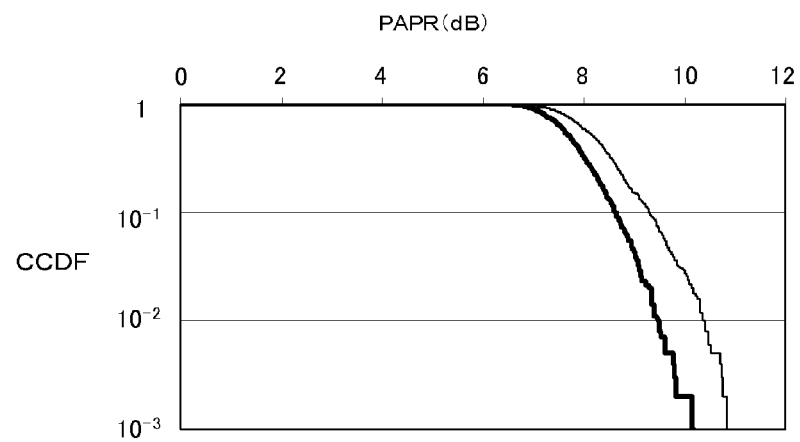
Figure 7C:
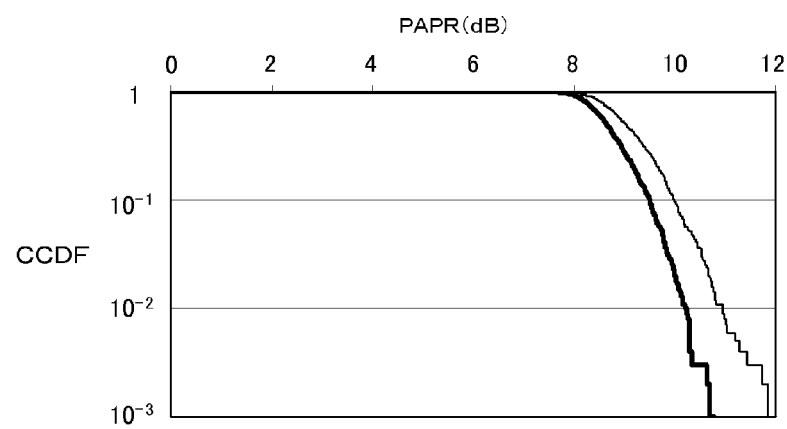

FIG. 7 is a diagram illustrating the CCDF characteristics of PAPR of the simulated baseband signal. The axis of abscissas indicates PAPR (in dB), and the axis of ordinate indicates the CCDF of PAPR. The CCDF characteristics of PAPR according to the conventional technique are illustrated by a thin solid graph, whereas the CCDF characteristics of PAPR according to the embodiment of the present invention are illustrated by a thick solid graph. According to the embodiment, a certain complex number and a primary modulation signal generated by applying a QPSK modulation to an input signal were used to generate a subcarrier modulation signal. The above-described calculation was carried out on the subcarrier modulation signal to generate a baseband signal. FIG. 7A illustrates a simulation result with an FFT size of 128, FIG. 7B illustrates a simulation result with an FFT size of 512, and FIG. 7C illustrates a simulation result with an FFT size of 2,048. In each case, PAPR according to the embodiment of the present invention is lower than PAPR according to the conventional technique.

According to the conventional technique, when the FFT size is 2,048 and the input signal is the same signal, which allows the phases of elements of the subcarrier modulation signal to have the same value, PAPR is 33. 1 dB. If the modulator 11 uses, for such an input signal, a predetermined number of complex numbers which allows the phase of the elements of the subcarrier modulation signal to have the same value, PAPR according to the embodiment of the present invention is 0 regardless of the FFT size, and is thus much lower than PAPR according to the conventional technique.

Figure 8:
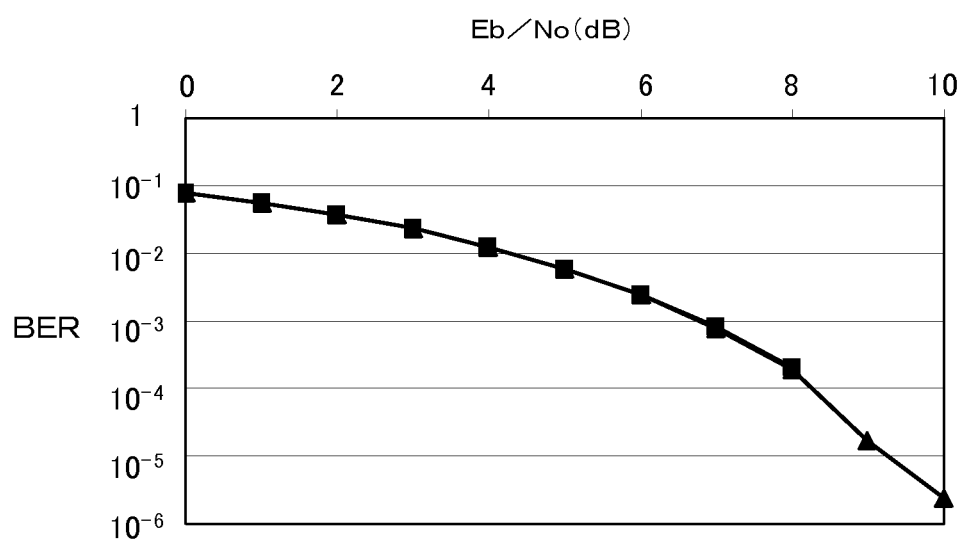
FIG. 8 is a diagram illustrating characteristics of a simulated BER.

For BER (Bit Error Ratio), a simulation was similarly carried out. FIG. 8 is a diagram illustrating BER characteristics determined as a result of the simulation. The axis of abscissas indicates Eb/No (Energy per Bit to Noise power spectral density ratio), and the axis of ordinate indicates BER. Eb/No is in units of dB. BER according to the conventional technique is illustrated by a graph with square plot points. BER according to the embodiment of the present invention is illustrated by a graph with triangular plot points. The graphs indicate that little difference in BER exists between the conventional technique and the embodiment of the present invention.

The above-described simulations indicate that, according to the embodiment, it is possible to reduce PAPR by generating a subcarrier modulation signal from a predetermined number of any complex numbers and a primary modulation signal and carrying out a predetermined calculation on the subcarrier modulation signal to generate a baseband signal.

The embodiment of the present invention is not limited to the above-described embodiment. The modulation manner carried out by the modulator 11 is not limited to QPSK, and modulation manners other than QPSK, such as PSK (Phase Shift Keying) and QAM (Quadrature Amplitude Modulation), used in some cases. The IFFT calculator 13 performs an IDFT instead of an IFFT, and the FFT calculator 34 performs a DFT instead of an FFT, in some cases.

The calculation processes carried out by the real-part calculator 151 and the imaginary-part calculator 152 are not limited to the calculation processes according to the above-described embodiment. For example, the real-part calculator 151 subtracts the average value of the elements of the real-part data from each element of the real-part data, in some cases. When the number of elements of the real-part data is denoted by N, the average value of the elements of the real-part data is a linear combination of the elements of the real-part data calculated with each coefficient set to 1/N.

Furthermore, for example, the real-part calculator 151 subtracts the median of the elements of the real-part data from each element of the real-part data, in some cases. If the number of the elements of the real-part data is odd, the median of the elements of the real-part data is a linear combination of the elements of the real-part data calculated such that a coefficient for an element positioned in the center of the elements of the real-part data arranged in order of increasing value is set to 1, with coefficients for the other elements set to 0. Additionally, if the number of the elements of the real-part data is even, the median of the elements of the real-part data is a linear combination of the elements of the real-part data calculated such that a coefficient for two elements positioned in the center of the elements of the real-part data arranged in order of increasing value is set to ½, with coefficients for the other elements set to 0.

It is possible to restore the input signal on the reception side if the predetermined elements to be extracted are known. Thus, on the transmission side, each time the real-part calculator 151 and the imaginary-part calculator 152 carry out calculation processes, the calculation processes are varied in some cases. Furthermore, each time a subcarrier modulation signal is generated, the complex numbers used are varied in some cases.

INDUSTRIAL APPLICABILITY

The present invention is preferred for a communication device.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication device which communicates with another device by wireless communication in an orthogonal frequency division multiplexing manner, the communication device comprising:
a modulator modulating an input signal in a predetermined modulation manner to generate a primary modulation signal, assigning a predetermined number of any complex numbers and elements of the primary modulation signal to subcarriers frequency components of which are orthogonal to each other to generate a subcarrier modulation signal;
an IFFT calculator applying an inverse fast fourier transform to the subcarrier modulation signal to generate a converted signal;
a decomposer decomposing the converted data into real-part data that is a real part of the converted data and imaginary-part data that is an imaginary part of the converted data;
a calculator subtracting, from each element of the real-part data, a linear combination of the elements of the real-part data obtained using coefficients each of which is a real number of 0 or more and which total 1, wherein the linear combination of the elements of the real-part data is an average value of a maximum value and a minimum value of the elements of the real-part data, an average value of the elements of the real-part data, or a median of the elements of the real-part data, and subtracting, from each element of the imaginary-part data, a linear combination of the elements of the imaginary-part data obtained using coefficients each of which is a real number of 0 or more and which total 1, wherein the linear combination of the elements of the imaginary-part data is an average value of a maximum value and a minimum value of the elements of the imaginary-part data, an average value of the elements of the imaginary-part data, or a median of the elements of the imaginary-part data;
a combiner generating a baseband signal based on data that is a combination of the real-part data and the imaginary-part data calculated by the calculator; and
a transmitter generating a transmission signal from the baseband signal and transmitting the transmission signal.

2. The communication device according to claim 1, wherein the modulator assigns one of the complex numbers and elements of the primary modulation signal to the subcarriers to generate the subcarrier modulation signal.

3. The communication device according to claim 1, wherein the modulator uses data with a value of 0 or 1 a number of which is determined based on the predetermined modulation manner to modulate the data in the predetermined modulation manner to generate the predetermined number of the complex numbers, and assigns the complex numbers and elements of the primary modulation signal to the subcarriers to generate the subcarrier modulation signal.

4. The communication device according to claim 2, wherein the modulator uses data with a value of 0 or 1 a number of which is determined based on the predetermined modulation manner to modulate the data in the predetermined modulation manner to generate the predetermined number of the complex numbers, and assigns the complex numbers and elements of the primary modulation signal to the subcarriers to generate the subcarrier modulation signal.

5. A communication device which communicates with another device by wireless communication in an orthogonal frequency division multiplexing manner, the communication device comprising:
a receiver receiving a transmission signal to generate a baseband signal;
a serial-parallel converter applying a serial-parallel conversion to the baseband signal to generate a parallel signal;
an FFT calculator applying a fast fourier transform to the parallel signal;
an extractor extracting elements in a second and subsequent rows from a calculation result from the FFT calculator to generate a subcarrier modulation signal; and
a demodulator demodulating the subcarrier modulation signal in a predetermined demodulation manner.

6. A communication method carried out by a communication device which communicates with another device by wireless communication in an orthogonal frequency division multiplexing manner, the method comprising:
a modulation step for modulating an input signal in a predetermined modulation manner to generate a primary modulation signal, assigning a predetermined number of any complex numbers and elements of the primary modulation signal to subcarriers frequency components of which are orthogonal to each other to generate a subcarrier modulation signal;
an IFFT calculation step for applying an inverse fast fourier transform to the subcarrier modulation signal to generate a converted signal;

a decomposition step for decomposing the converted data into real-part data that is a real part of the converted data and imaginary-part data that is an imaginary part of the converted data;

a calculation step for subtracting, from each element of the real-part data, a linear combination of the elements of the real-part data obtained using coefficients each of which is a real number of 0 or more and which total 1, wherein the linear combination of the elements of the real-part data is an average value of a maximum value and a minimum value of the elements of the real-part data, an average value of the elements of the real-part data, or a median of the elements of the real-part data, and subtracting, from each element of the imaginary-part data, a linear combination of the elements of the imaginary-part data obtained using coefficients each of which is a real number of 0 or more and which total 1, wherein the linear combination of the elements of the imaginary-part data is an average value of a maximum value and a minimum value of the elements of the imaginary-part data, an average value of the elements of the imaginary-part data, or a median of the elements of the imaginary-part data;

a combination step for generating a baseband signal based on data that is a combination of the real-part data and the imaginary-part data calculated by the calculator; and a transmission step for generating a transmission signal from the baseband signal and transmitting the transmission signal.

7. The communication method according to claim 6, wherein the modulation step assigns one of the complex numbers and elements of the primary modulation signal to each of the subcarriers to generate the subcarrier modulation signal.

8. The communication method according to claim 6, wherein the modulation step uses data with a value of 0 or 1 a number of which is determined based on the predetermined modulation manner to modulate the data in the predetermined modulation manner to generate the predetermined number of the complex numbers, and assigns the complex numbers and elements of the primary modulation signal to the subcarriers to generate the subcarrier modulation signal.

9. The communication method according to claim 7, wherein the modulation step uses data with a value of 0 or 1 a number of which is determined based on the predetermined modulation manner to modulate the data in the predetermined modulation manner to generate the predetermined number of the complex numbers, and assigns the complex numbers and elements of the primary modulation signal to the subcarriers to generate the subcarrier modulation signal.

10. A communication method carried out by a communication device which communicates with another device by wireless communication in an orthogonal frequency division multiplexing manner, the method including:

a reception step for receiving a transmission signal to generate a baseband signal;

a serial-parallel conversion step for applying a serial-parallel conversion to the baseband signal to generate a parallel signal;

an FFT calculation step for applying a fast fourier transform to the parallel signal;

an extraction step for extracting elements in a second and subsequent rows from a calculation result from the FFT calculation step to generate a subcarrier modulation signal; and a demodulation step for demodulating the subcarrier modulation signal in a predetermined demodulation manner.

\* \* \* \* \*